(12) United States Patent
Cui et al.

(10) Patent No.: US 11,615,548 B2
(45) Date of Patent: Mar. 28, 2023

(54) METHOD AND SYSTEM FOR DISTANCE MEASUREMENT BASED ON BINOCULAR CAMERA, DEVICE AND COMPUTER-READABLE STORAGE MEDIUM

(71) Applicant: Beijing Smarter Eye Technology Co. Ltd., Beijing (CN)

(72) Inventors: Feng Cui, Beijing (CN); Zhao Sun, Beijing (CN); Yongcai Liu, Beijing (CN); Shanshan Pei, Beijing (CN); Jian Li, Beijing (CN)

(73) Assignee: Beijing Smarter Eye Technology Co. Ltd., Beijing (CN)

( * ) Notice: Subject to any disclaimer, the term of this patent is extended or adjusted under 35 U.S.C. 154(b) by 295 days.

(21) Appl. No.: 17/124,028

(22) Filed: Dec. 16, 2020

(65) Prior Publication Data
US 2022/0044433 A1 Feb. 10, 2022

(30) Foreign Application Priority Data

Aug. 4, 2020 (CN) .......................... 202010769777.X

(51) Int. Cl.
| | |
|---|---|
| *G06T 7/593* | (2017.01) |
| *G06T 7/80* | (2017.01) |
| *H04N 13/204* | (2018.01) |
| *H04N 13/00* | (2018.01) |

(52) U.S. Cl.
CPC .............. *G06T 7/593* (2017.01); *G06T 7/80* (2017.01); *H04N 13/204* (2018.05); *G06T 2207/10012* (2013.01); *G06T 2207/30204* (2013.01); *H04N 2013/0081* (2013.01)

(58) Field of Classification Search
CPC .......... H04N 2013/0081; H04N 13/204; G06T 2207/30204; G06T 2207/10012; G06T 7/80; G06T 7/593
See application file for complete search history.

(56) References Cited

U.S. PATENT DOCUMENTS

2022/0046218 A1* 2/2022 Fan .......................... G06T 7/11

* cited by examiner

*Primary Examiner* — Kathleen V Nguyen
(74) *Attorney, Agent, or Firm* — Novick, Kim & Lee, PLLC; Allen Xue

(57) ABSTRACT

The present disclosure provides a method for distance measurement based on a binocular camera, a system for distance measurement based on a binocular camera, a device and a computer-readable storage medium. The method includes: taking N images of a distance measurement marker placed at each of Z positions in a depth direction of the binocular camera; calculating an average disparity of the distance measurement marker at the middle position, the left side position and the right side position at each of the Z positions; calculating a distance measurement value at each of the Z positions in the depth direction; calculating a distance measurement error value at the middle position, the left side position and the right side position at each of the Z positions, and acquiring a total error cost function; and calculating extrinsic parameters, so as to acquire a distance measurement result in the depth direction.

13 Claims, 2 Drawing Sheets

METHOD AND SYSTEM FOR DISTANCE MEASUREMENT BASED ON BINOCULAR CAMERA, DEVICE AND COMPUTER-READABLE STORAGE MEDIUM

TECHNICAL FIELD

The present disclosure relates to the field of binocular camera, in particular to a method for distance measurement based on a binocular camera, a system for distance measurement based on a binocular camera, a device and a computer-readable storage medium.

BACKGROUND

In a three-dimensional reconstruction technology for a binocular camera, physical coordinates of a real object represented by pixel points in a world coordinate system is calculated in accordance with a position relationship between two lenses, so as to achieve accurate three-dimensional reconstruction. Under the restraint of a mathematical model of "epipolar geometry", an error level of the three-dimensional reconstruction depends on the accuracy of the distance measurement in a depth direction.

Hence, for the binocular camera, the accuracy of the distance measurement in the depth direction must be ensured. In a conventional binocular distance measurement scheme for the three-dimensional reconstruction, it is impossible for a distance measurement error in the depth direction to meet the accuracy requirement.

SUMMARY

An object of the present disclosure is to provide a method for distance measurement based on a binocular camera, a system for distance measurement based on a binocular camera, a device and a computer-readable storage medium, so as to, as an off-line adjustment scheme, improve the accuracy of the three-dimensional reconstruction of the binocular camera.

In one aspect, the present disclosure provides in some embodiments a method for distance measurement based on a binocular camera, including: taking N images of a distance measurement marker placed at each of Z positions in a depth direction of the binocular camera, the distance measurement marker being placed at a middle position, a left side position and a right side position of a horizontal width of the binocular camera, Z and N each being an integer greater than 1; calculating an average disparity of the distance measurement marker at the middle position, the left side position and the right side position at each of the Z positions; calculating a distance measurement value at each of the Z positions in the depth direction in accordance with a base line of the binocular camera, a focal length of the binocular camera, and the average disparity; calculating a distance measurement error value at the middle position, the left side position and the right side position at each of the Z positions, and acquiring a total error cost function in accordance with the distance measurement error value at each of the Z positions; and calculating extrinsic parameters, including translation matrix T and a rotation matrix R, in the case that the total error cost function has a minimum value, so as to acquire a distance measurement result in the depth direction.

In a possible embodiment of the present disclosure, the distance measurement value at each of the Z positions in the depth direction is calculated in accordance with the base line of the binocular camera, the focal length of the binocular camera, and the average disparity through a formula $$z = \frac{bf}{d},$$

where b represents the base line of the binocular camera, f represents the focal length of the binocular camera, d represents the average disparity, and z represents the distance measurement value in the depth direction.

In a possible embodiment of the present disclosure, the distance measurement error value at the middle position, the left side position and the right side position at each of the Z positions is calculated through a formula $E_k^z = Z_k^z - Z_o^z$, where z represents a distance measurement value at each of the Z positions, k represents the middle position, the left side position and the right side position at each of the Z positions, $Z_o$=D1, D2, D3, . . . , Dmax, and $Z_o$ represents a standard distance measurement position.

In a possible embodiment of the present disclosure, the extrinsic parameters, including the translation matrix T and the rotation matrix R, are calculated in the case that the total error cost function has a minimum value through a formula $[R,T]= \arg\min_{R,T} \Sigma_z \Sigma_k E_k^z$, and the total error cost function is $E(R,T) = \Sigma_z \Sigma_k E_k^z$.

In another aspect, the present disclosure provides in some embodiments a system for distance measurement based on a binocular camera, including: a photographing module configured to take N images of a distance measurement marker placed at each of Z positions in a depth direction of the binocular camera, the distance measurement marker being placed at a middle position, a left side position and a right side position of a horizontal width of the binocular camera, Z and N each being an integer greater than 1; an average disparity calculation module configured to calculate an average disparity of the distance measurement marker at the middle position, the left side position and the right side position at each of the Z positions; a depth direction distance measurement value calculation module configured to calculate a distance measurement value at each of the Z positions in the depth direction in accordance with a base line of the binocular camera, a focal length of the binocular camera, and the average disparity; a total error cost calculation module configured to calculate a distance measurement error value at the middle position, the left side position and the right side position at each of the Z positions, and acquire a total error cost function in accordance with the distance measurement error value at each of the Z positions; and an extrinsic parameter calculation module configured to calculate extrinsic parameters, including a translation matrix T and a rotation matrix R, in the case that the total error cost function has a minimum value, so as to acquire a distance measurement result in the depth direction.

In a possible embodiment of the present disclosure, the depth direction distance measurement value calculation module is further configured to calculate the distance measurement value in the depth direction through a formula $$z = \frac{bf}{d},$$

where b represents the base line of the binocular camera, f represents the focal length of the binocular camera, d represents the average disparity, and z represents the distance measurement value in the depth direction.

In a possible embodiment of the present disclosure, the total error cost calculation module is further configured to calculate the distance measurement error value through a formula $E_k^z = Z_k^z - Z_o^z$, where z represents a distance measurement value at each of the Z positions, k represents the middle position, the left side position and the right side position at each of the Z positions, $Z_0$=D1, D2, D3, . . . , Dmax, and $Z_0$ represents a standard distance measurement position.

In a possible embodiment of the present disclosure, the extrinsic parameter calculation module is further configured to calculate the extrinsic parameters, including the translation matrix T and the rotation matrix R, through a formula $[R,T] = \arg\min_{R,T} \Sigma_z \Sigma_k E_k^z$, and the total error cost function is $E(R,T) = \Sigma_z \Sigma_k E_k^z$.

In yet another aspect, the present disclosure provides in some embodiments a device, including a data collection unit, a processor and a memory. The data collection unit is configured to collect data, the memory is configured to store therein one or more program instructions, and the processor is configured to execute the one or more program instructions so as to implement the above-mentioned method.

In still yet another aspect, the present disclosure provides in some embodiments a computer-readable storage medium storing therein one or more program instructions for implementing the above-mentioned method.

According to the method for distance measurement based on a binocular camera, the system for distance measurement based on a binocular camera, the device and the computer-readable storage medium in the embodiments of the present disclosure, the N images of the distance measurement marker placed at the Z positions in the depth direction of the binocular camera may be taken, and the distance measurement marker may be placed at the middle position, the left side position and the right side position of the horizontal width of the binocular camera. Next, the average disparity of the distance measurement marker at the middle position, the left side position and the right side position at each of the Z positions may be calculated. Next, the distance measurement value at each of the Z positions in the depth direction may be calculated in accordance with the base line of the binocular camera, the focal length of the binocular camera, and the average disparity. Next, the distance measurement error value at the middle position, the left side position and the right side position at each of the Z positions may be calculated, and the total error cost function may be acquired in accordance with the distance measurement error value at each of the Z positions. Then, the extrinsic parameters, including the translation matrix T and the rotation matrix R, may be calculated in the case that the total error cost function has a minimum value, so as to acquire the distance measurement result in the depth direction. As a result, it is able to improve the three-dimensional reconstruction accuracy of the binocular camera.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

The structure, scale and size shown in the drawings are merely provided to facilitate the understanding of the contents disclosed in the description but shall not be construed as limiting the scope of the present disclosure, so they has not substantial meanings technically. Any modification on the structure, any change to the scale or any adjustment on the size shall also fall within the scope of the present disclosure in the case of not influencing the effects and the purposes of the present disclosure.

DETAILED DESCRIPTION

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

Technical terms involved in the embodiments of the present disclosure will be explained hereinafter. "World coordinate system" refers to a coordinate system with an optical axis of a camera as a z axis and with an imaging plane as an xoy plane, "depth direction" refers to a z-axis direction in the world coordinate system, and "extrinsic parameter of camera" refers to a position relation between lenses of a binocular camera and consist of a translation matrix T and a rotation matrix R.

Figure 1:
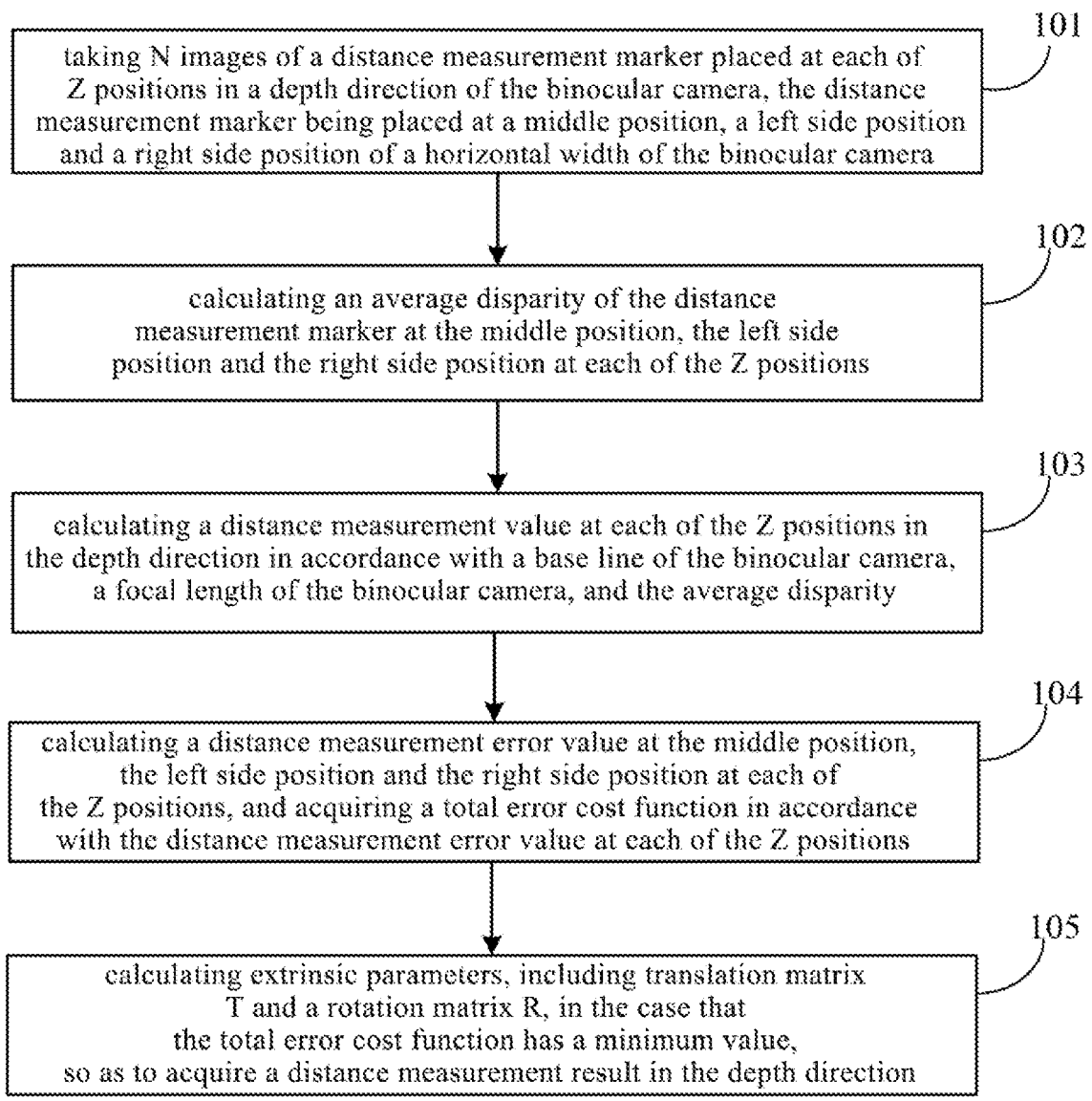
FIG. 1 is a flow chart of a method for distance measurement based on a binocular camera according to one embodiment of the present disclosure.

As shown in FIG. 1, the present disclosure provides in some embodiments a method for distance measurement based on a binocular camera, which includes: Step 101 of taking N images of a distance measurement marker placed at each of Z positions in a depth direction of the binocular camera, the distance measurement marker being placed at a middle position, a left side position and a right side position of a horizontal width of the binocular camera, Z and N each being an integer greater than 1; Step 102 of calculating an average disparity of the distance measurement marker at the middle position, the left side position and the right side position at each of the Z positions; Step 103 of calculating a distance measurement value at each of the Z positions in the depth direction in accordance with a base line of the binocular camera, a focal length of the binocular camera, and the average disparity; Step 104 of calculating a distance measurement error value at the middle position, the left side position and the right side position at each of the Z positions, and acquiring a total error cost function in accordance with the distance measurement error value at each of the Z positions; and Step 105 of calculating extrinsic parameters, including a translation matrix T and a rotation matrix R, in the case that the total error cost function has a minimum value, so as to acquire a distance measurement result in the depth direction.

In a possible embodiment of the present disclosure, in Step 103, the distance measurement value at each of the Z positions in the depth direction may be calculated in accordance with the base line of the binocular camera, the focal length of the binocular camera, and the average disparity through a formula $$z = \frac{bf}{d} \quad (1),$$

where b represents the base line of the binocular camera, f represents the focal length of the binocular camera, d represents the average disparity, and z represents the distance measurement value in the depth direction.

In a possible embodiment of the present disclosure, in Step 104, the distance measurement error value at the middle position, the left side position and the right side position at each of the Z positions may be calculated through a formula $E_k^z = Z_k^z - Z_o^z$, (2), where z represents a distance measurement value at each of the Z positions, k represents the middle position, the left side position and the right side position at each of the Z positions, $Z_0$=D1, D2, D3, ..., Dmax, and $Z_0$ represents a standard distance measurement position.

In a possible embodiment of the present disclosure, in Step 105, the extrinsic parameters, including the translation matrix T and the rotation matrix R, may be calculated in the case that the total error cost function has a minimum value through a formula [R,T]=arg $\min_{R,T} \Sigma_z \Sigma_k E_k^z$ (3), and the total error cost function may be $E(R,T) = \Sigma_z \Sigma_k E_k^z$.

The method for distance measurement based on a binocular camera in the embodiments of the present disclosure will be described hereinafter in more details.

Step 1: placing the distance measurement marker at the middle position of the horizontal width of a left-eye lens at a distance of D1m from the binocular camera in the depth direction, and taking and recording N frames.

Step 2: placing the distance measurement marker at the left side position of the horizontal width of the left-eye lens at a distance of D2m from the binocular camera in the depth direction, and taking and recording N frames.

Step 3: placing the distance measurement marker at the right side position of the horizontal width of the left-eye lens at a distance of D3m from the binocular camera in the depth direction, and taking and recording N frames.

Step 4: collecting a group of image data acquired in the above three steps, and calculating the average disparity at each of the left side position, the middle position and the right side position as a to-be-used data set 1.

Step 5: repeating Steps 1 to 4 at different positions until the distance measurement marker is at a distance of Dmax m in the depth direction, and collecting the corresponding data.

Step 6: calculating the distance measurement value in the depth direction through the $$z = \frac{bf}{d}$$

formula for a binocular three-dimensional reconstruction scheme, where b represents the base line of the binocular camera, f represents the focal length of the binocular camera, d represents the average disparity, and z represents the distance measurement value in the depth direction.

Step 7: performing Step 6 with respect to a plurality of groups of data, and calculating three distance measurement error values at the left side position, the central position and the right side position through the formula $E_k^z = Z_k^z - Z_o^z$, with respect to each group of data, where z represents groups of data at different distances, k=left, middle, right and it represents three different positions for each group of data, $Z_0$=D1, D2, D3, ..., Dmax, and $Z_0$ represents the standard distance measurement position.

Step 8: calculating a sum of all the distance measurement error values acquired in Step 7 to acquire the total error cost function $E(R,T) = \Sigma_z \Sigma_k E_k^z$. The total error cost function may be used to represent that the extrinsic parameters R and T of the binocular camera are independent variables affecting the distance measurement accuracy in the depth direction.

Step 9: calculating the extrinsic parameters R and T when the total error cost function has a minimum value, i.e., [R,T]=arg $\min_{R,T} \Sigma_z \Sigma_k E_k^z$, so as to acquire the accurate distance measurement result in the depth direction.

In a word, according to the method for distance measurement based on a binocular camera in the embodiments of the present disclosure, the N images of the distance measurement marker placed at the Z positions in the depth direction of the binocular camera may be taken, and the distance measurement marker may be placed at the middle position, the left side position and the right side position of the horizontal width of the binocular camera. Next, the average disparity of the distance measurement marker at the middle position, the left side position and the right side position at each of the Z positions may be calculated. Next, the distance measurement value at each of the Z positions in the depth direction may be calculated in accordance with the base line of the binocular camera, the focal length of the binocular camera, and the average disparity. Next, the distance measurement error value at the middle position, the left side position and the right side position at each of the Z positions may be calculated, and the total error cost function may be acquired in accordance with the distance measurement error value at each of the Z positions. Then, the extrinsic parameters, including the translation matrix T and the rotation matrix R, may be calculated in the case that the total error cost function has a minimum value, so as to acquire the distance measurement result in the depth direction. As a result, it is able to improve the three-dimensional reconstruction accuracy of the binocular camera.

Figure 2:
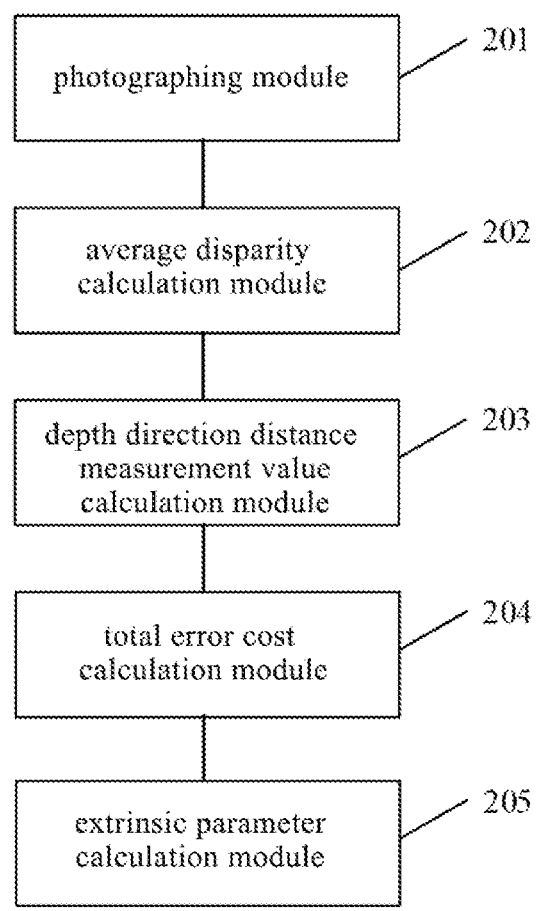
FIG. 2 is a block diagram of a system for distance measurement based on a binocular camera according to one embodiment of the present disclosure.

Based on a same inventive concept, the present disclosure further provides in some embodiments a system for distance measurement based on a binocular camera which, as shown in FIG. 2, includes: a photographing module 201 configured to take N images of a distance measurement marker placed at each of Z positions in a depth direction of the binocular camera, the distance measurement marker being placed at a middle position, a left side position and a right side position of a horizontal width of the binocular camera, Z and N each being an integer greater than 1; an average disparity calculation module 202 configured to calculate an average disparity of the distance measurement marker at the middle position, the left side position and the right side position at each of the Z positions; a depth direction distance measurement value calculation module 203 configured to calculate a distance measurement value at each of the Z positions in the depth direction in accordance with a base line of the binocular camera, a focal length of the binocular camera, and the average disparity; a total error cost calculation module 204 configured to calculate a distance measurement error value at the middle position, the left side position and the right side position at each of the Z positions, and acquire a total error cost function in accordance with the distance measurement error value at each of the Z positions; and an extrinsic parameter calculation module 205 configured to calculate extrinsic parameters, including a translation matrix T and a rotation matrix R, in the case that the total error cost function has a minimum value, so as to acquire a distance measurement result in the depth direction.

In a possible embodiment of the present disclosure, the depth direction distance measurement value calculation module 203 is further configured to calculate the distance measurement value in the depth direction through the above-mentioned formula (1).

In a possible embodiment of the present disclosure, the total error cost calculation module 204 is further configured to calculate the distance measurement error value through the above-mentioned formula (2).

In a possible embodiment of the present disclosure, the extrinsic parameter calculation module 205 is further configured to calculate the extrinsic parameters through the above-mentioned formula (3).

Based on a same inventive concept, the present disclosure further provides in some embodiments a device, which includes a data collection unit, a processor and a memory. The data collection unit is configured to collect data, the memory is configured to store therein one or more program instructions, and the processor is configured to execute the one or more program instructions so as to implement the above-mentioned method.

Based on a same inventive concept, the present disclosure further provides in some embodiments a computer-readable storage medium storing therein one or more program instructions for implementing the above-mentioned method.

The above embodiments have been described in a progressive manner, and the same or similar contents in the embodiments will not be repeated, i.e., each embodiment merely focuses on the difference from the others.

It should be appreciated that, although the steps of the method have been described in a specific order in the drawings, it does not require or imply that these steps must be performed in the specific order, or all the steps must be performed to acquire a desired result. Alternatively or in addition, some steps may be omitted, some steps may be performed as one, and/or one step may be divided into a plurality of steps.

Although the steps of the method have been described in the embodiments or the flow chart, more or fewer steps may be included on the basis of conventional or non-creative means. An order of the steps listed in the embodiments of the present disclosure may merely be one of various orders, rather than a unique one. When the method is executed by a device or a client product, the steps may be executed in the order shown in the embodiments of the present disclosure or the drawings, or may be executed in parallel (e.g., in an environment where parallel processors are provided or multithread processing is adopted, or even in an environment where distributed data processing is adopted). Such words as "include" or "including" or any other variations involved in embodiments of the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The units, devices or modules mentioned hereinabove may be specifically implemented by a computer chip or an entity, or by a product having a certain function. For ease of description, the modules of the device may be described on the basis of functions. Of course, the functions of the modules may also be achieved in same or different software and/or hardware, or the module for achieving a same function may be implemented by a combination of sub-modules or sub-units. The above device embodiments are for illustrative purposes only, and the units may be provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

It should be further appreciated that, apart from pure computer-readable program codes, the controller may be acquired through programming the steps of the method, so as to achieve the same function in the form of logic gate, switch, application-specific integrated circuit, programmable logic controller or embedded microcontroller. Hence, this controller may be considered as a hardware component, and units in the controller for achieving various functions may be considered as structures in the hardware component. In addition, the units for achieving various functions may be considered as not only software modules for implementing the method but also the structures in the hardware component.

Usually, the present disclosure may be described in the context of the computer-executable instructions, e.g., program modules. The program module may include routines, programs, objects, assemblies, data structures or categories for executing a specific task or achieving a specific abstract data type. In addition, the present disclosure may be practiced in distributed computing environments. In these distributed computing environments, the task may be executed by remote processing devices connected via a commination network, and the program module may be located in a local storage medium and a remote storage medium, including a storage device.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include several instructions so as to enable a terminal device (mobile phone, computer, server or network device) to execute the method in the embodiments of the present disclosure.

It should be further appreciated that, the above embodiments have been described in a progressive manner, and the same or similar contents in the embodiments have not been repeated, i.e., each embodiment has merely focused on the difference from the others. The scheme in the embodiments of the present disclosure may be applied to various general-purpose or specific computer system environments or configurations, e.g., person computer, server computer, handheld or portable device, tablet device, multi-processor system, microprocessor-based system, set-top box, programmable electronic device, network computer, small-size computer, large-scale computer, or a distributed computing environment including any of the above-mentioned system or device.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for distance measurement based on a binocular camera, comprising:
taking N images of a distance measurement marker placed at each of Z positions in a depth direction of the binocular camera, the distance measurement marker being placed at each of a middle position, a left side position, and a right side position of a horizontal width of the binocular camera, Z and N each being an integer greater than 1;
calculating an average disparity of the distance measurement marker at the middle position, the left side position, and the right side position at each of the Z positions;
calculating a distance measurement value at each of the Z positions in the depth direction in accordance with a base line of the binocular camera, a focal length of the binocular camera, and the average disparity;
calculating a distance measurement error value at the middle position, the left side position, and the right side position at each of the Z positions, and acquiring a total error cost function in accordance with the distance measurement error value at each of the Z positions; and
calculating extrinsic parameters, comprising a translation matrix T and a rotation matrix R when the total error cost function has a minimum value, so as to acquire a distance measurement result in the depth direction.

2. The method according to claim 1, wherein the distance measurement value at each of the Z positions in the depth direction is calculated in accordance with the base line of the binocular camera, the focal length of the binocular camera, and the average disparity using a formula $$z = \frac{bf}{d},$$

where b represents the base line of the binocular camera, f represents the focal length of the binocular camera, d represents the average disparity, and z represents the distance measurement value in the depth direction.

3. The method according to claim 1, wherein the distance measurement error value at the middle position, the left side position, and the right side position at each of the Z positions is calculated using a formula $E_k^z = Z_k^z - Z_o^z$ where z represents a distance measurement value at each of the Z positions, k represents the middle position, the left side position, and the right side position at each of the Z positions, and $Z_0 = D1, D2, D3, \ldots, Dmax$, $Z_0$ representing a standard distance measurement position.

4. The method according to claim 1, wherein the extrinsic parameters, comprising the translation matrix T and the rotation matrix R, are calculated when the total error cost function has a minimum value using a formula $[R,T] = \arg \min_{R,T} \Sigma_z \Sigma_k E_k^z$, and the total error cost function is $E(R,T) = \Sigma_z \Sigma_k E_k^z$.

5. A device, comprising a data collection unit, a processor and a memory, wherein the data collection unit is configured to collect data, the memory is configured to store therein one or more program instructions, and the processor is configured to execute the method according to claim 1.

6. A computer-readable storage medium storing therein one or more program instructions for implementing the method for distance measurement based on a binocular camera according to claim 1.

7. A computer-readable storage medium storing therein one or more program instructions for implementing the method for distance measurement based on a binocular camera according to claim 2.

8. A computer-readable storage medium storing therein one or more program instructions for implementing the method for distance measurement based on a binocular camera according to claim 3.

9. A computer-readable storage medium storing therein one or more program instructions for implementing the method for distance measurement based on a binocular camera according to claim 4.

10. A system for distance measurement based on a binocular camera, comprising:
a photographing module configured to take N images of a distance measurement marker placed at each of Z positions in a depth direction of the binocular camera, the distance measurement marker being placed at a middle position, a left side position, or a right side position of a horizontal width of the binocular camera, Z and N each being an integer greater than 1;
an average disparity calculation module configured to calculate an average disparity of the distance measurement marker at the middle position, the left side position, and the right side position at each of the Z positions;
a depth direction distance measurement value calculation module configured to calculate a distance measurement value at each of the Z positions in the depth direction in accordance with a base line of the binocular camera, a focal length of the binocular camera, and the average disparity;
a total error cost calculation module configured to calculate a distance measurement error value at the middle position, the left side position, and the right side position at each of the Z positions, and acquire a total error cost function in accordance with the distance measurement error value at each of the Z positions; and
an extrinsic parameter calculation module configured to calculate extrinsic parameters, comprising a translation matrix T and a rotation matrix R when the total error cost function has a minimum value, so as to acquire a distance measurement result in the depth direction.

11. The system according to claim 10, wherein the depth direction distance measurement value calculation module is further configured to calculate the distance measurement value in the depth direction using a formula $$z = \frac{bf}{d},$$

wherein b represents the base line of the binocular camera, f represents the focal length of the binocular camera, d represents the average disparity, and z represents the distance measurement value in the depth direction.

12. The system according to claim 10, wherein the total error cost calculation module is further configured to calculate the distance measurement error value through a formula $E_k^z = Z_k^z - Z_o^z$, where z represents a distance measurement value at each of the Z positions, k represents the middle position, the left side position, and the right side position at each of the Z positions, and $Z_O$=D1, D2, D3, . . . , Dmax, $Z_O$ representing a standard distance measurement position.

13. The system according to claim 10, wherein the extrinsic parameter calculation module is further configured to calculate the extrinsic parameters, comprising the translation matrix T and the rotation matrix R, using a formula $[R,T] = \arg\min_{R,T} \Sigma_z \Sigma_k E_k^z$ and the total error cost function is $E(R,T) = \Sigma_z \Sigma_k E_k^z$.

\* \* \* \* \*